Feb. 19, 1924.
J. MARGUS
FISH TOY
Filed April 20, 1922
1,484,182
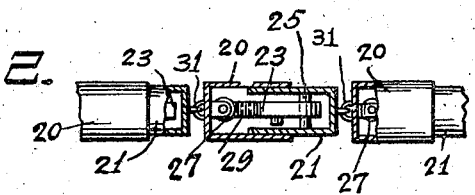
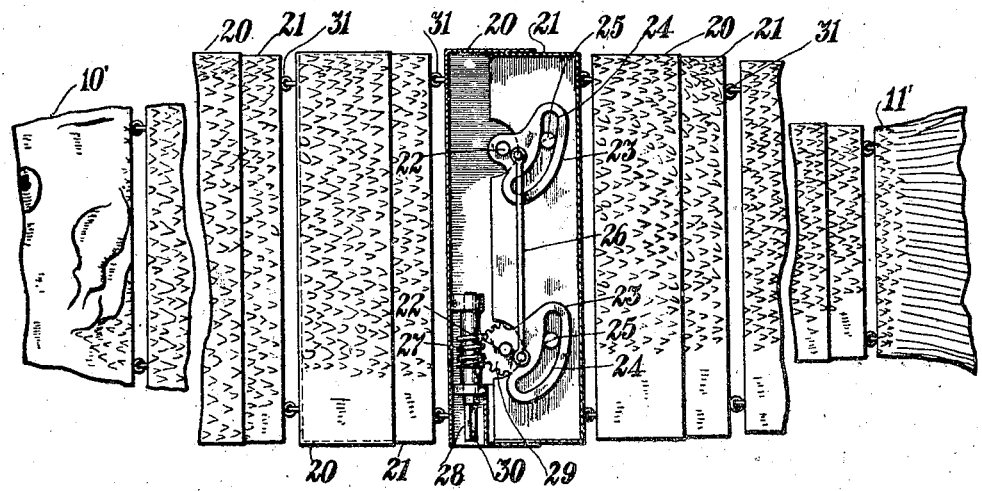
Inventor
Julie Margus
By Zoltan T. Polachek
Attorney Patented Feb. 19, 1924.

1,484,182

UNITED STATES PATENT OFFICE.

JULIE MARGUS, OF BERKELEY, CALIFORNIA.

FISH TOY.

Application filed April 20, 1922. Serial No. 555,729.

*To all whom it may concern:*

Be it known that I, JULIE MARGUS, a subject of Russia, residing at Berkeley, in the county of Alameda and State of California, have invented certain new and useful Improvements in Fish Toys, of which the following is a specification.

This invention relates generally to toys, and it has for a general object to provide a novel toy of inexpensive construction.

For further comprehension of the invention, and of the objects and advantages thereof, reference will be had to the following description and accompanying drawings, and to the appended claims in which the various novel features of the invention are more particularly set forth.

Fig. 1 is a fragmentary longitudinal view on an enlarged scale, this view being partly in side elevation and partly in vertical section.

Fig. 2 is a partial horizontal section on Fig. 1.

My improved toy as here embodied is arranged in the form of a fish and is constructed so as to have an end to end flexibility or sinuosity similar to that of a fish. In constructing my improved toy I provide a flat front plate 10 and rear plate 11 shaped in outline to correspond to the head and tail of the fish and having straight vertical rear and front edges respectively. Between these plates are a series of flat vertically elongated members or slats which have a hinge connection with one another, the end ones having a like connection with the head and tail plates 10 and 11 respectively.

In Figs. 1 and 2 I have shown in detail arrangement which permits of changing of the length of the fish. As here shown the body is formed of a series of hollow vertical strips each comprising the casing elements 20 and 21 which telescope into one another longitudinally of the fish. Pivoted in the casing element 20, as indicated at 22, are a pair of vertically spaced cams 23 having spiral cam slots 24 therein in which engage pins 25 fixed in the other element 21. These cams are connected together to operate in unison by a link 26 and are adapted to be operated by a worm pinion 27 fixed on a stub shaft 28 suitably journaled in the casing element 20 and engaging a worm segment 29 formed on one of the cams 23. The shaft 28 has one end extended through a suitable opening in the end of the casing element 20 and provided with a square socket 30 to receive a suitable turning tool.

I have shown the telescopic body slats as provided on their edges with inter-engaging eyes 31 whereby they are hinged together, a similar means connecting the end slats to the head 10' and tail 11'. As will be apparent the width of each slat may be varied by rotating its shaft 28, enabling the length of the fish to be varied to an amount equal to the sum of all the variations of the individual slats. The toy, as is evident, may be manipulated by hand to simulate the movements of a fish.

Having thus described my invention what I claim as new and desire to protect by Letters Patent of the United States is as follows:

1. A toy formed to represent a fish having the body thereof formed of a series of vertical slats hinged at their sides to one another, each of said slats comprising a pair of casing elements telescoping one into the other longitudinally of the fish, and means for telescopically adjusting said elements.

2. A toy formed to represent a fish having the body thereof formed of a series of vertical slats hinged at their sides to one another, each of said slats comprising a pair of casing elements telescoping one into the other longitudinally of the fish, and means for telescopically adjusting said elements, said means comprising a pair of cams pivoted in one of said elements and engaging a part on the other element, a link connecting said cams together, and worm and pinion means for rotating one of said cams.

In testimony whereof I have affixed my signature.

JULIE MARGUS.